UNITED STATES PATENT OFFICE 2,625,347

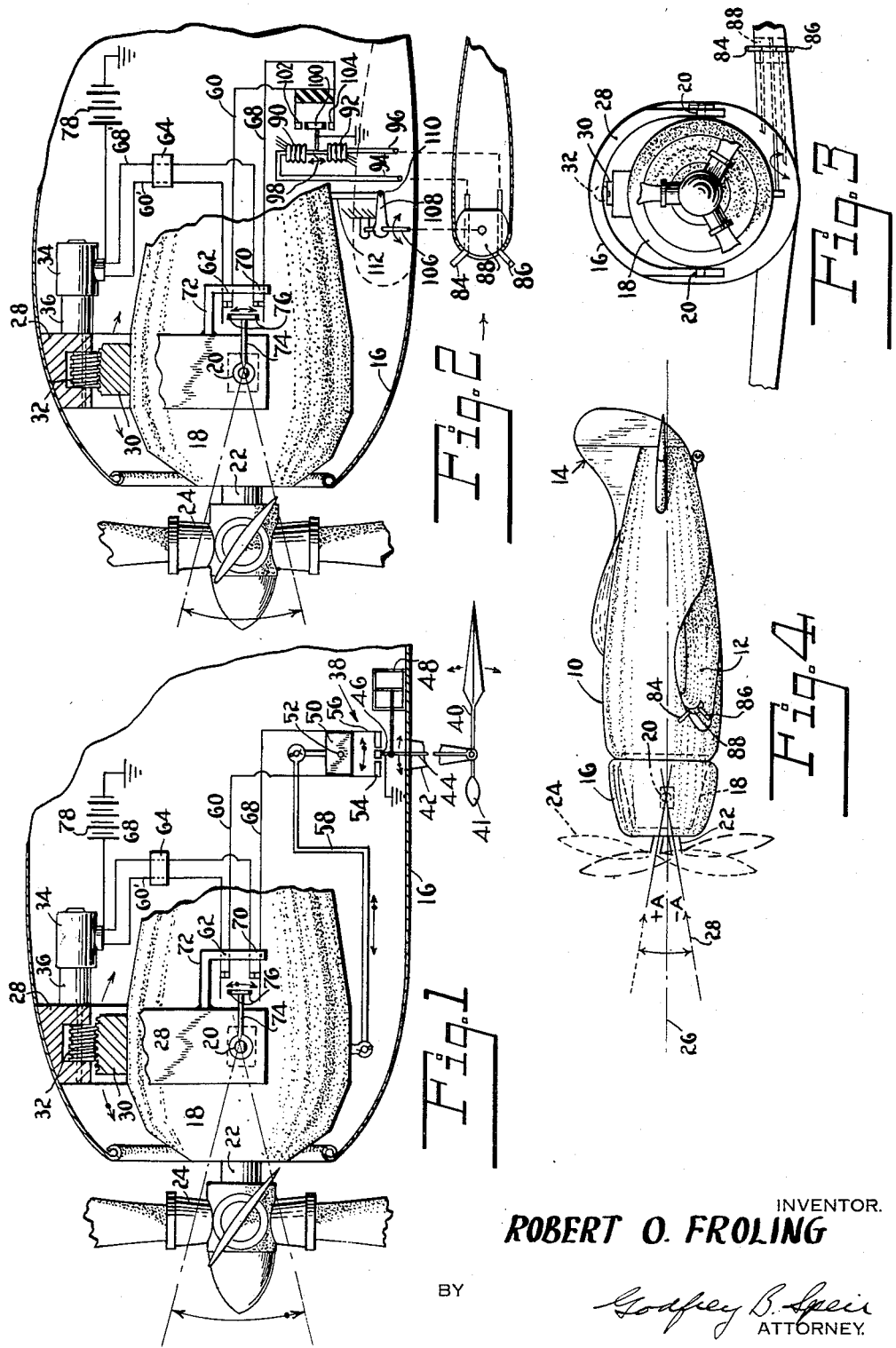

TILTABLE PROPELLER FOR AIRCRAFT

Robert O. Froling, Caldwell, N. J., assignor to Curtiss-Wright Corporation, a corporation of Delaware Application November 6, 1948, Serial No. 58,744

2 Claims. (Cl. 244—56)

This invention relates to aircraft propulsion systems and more particularly to means for reducing the stresses in the blades of aircraft propellers and in the propulsion system and its components resulting from operation of the propeller in flight.

As the power, speed and ratio of minimum to maximum load carrying ability of aircraft have increased, problems in the design of aircraft for minimum weight and optimum performance have arisen. One such problem comprehends the increase in stresses in propeller blades which occurs from operation of a propeller when its axis is angularly displaced with respect to the relative wind. The operation of the propeller under these conditions excites a propeller-speed frequency vibration in the propeller blade. The excitation of this vibration can be visualized from the following qualitative example; when the aircraft, and hence the propeller, is operating at a positive angle of attack as in a climb, the axis of the propeller lies at a positive angle with respect to the relative wind and the plane of the propeller is accordingly tilted with respect to the relative wind. The upper sweep of any one propeller blade consequently will produce a slightly different thrust effect than the lower sweep of the propeller blade and the difference in thrust force produced by the blades as between the upper and lower sweeps thereof sets up an exciting force in the blade recurring at a frequency equal to propeller R. P. M., producing a tendency for the blade to vibrate. This vibration, hereafter called L. P. vibration, produces significant increases in the stress level at which the propeller blades operate either accompanied by, or not accompanied by, resonance of the vibration with natural periods of vibration of the blades or power plant components. These high stresses may, if sustained over a protracted period of time, accelerate failure of the equipment. The forces due to L. P. blade vibration are imposed on the propeller hub and on the propeller shaft as vibratory stresses, and on the supporting structure substantially as steady stresses.

The invention sets out to eliminate or minimize the L. P. vibration excitation in the propeller and the undesirable results flowing from this vibration. It is an object of this invention to provide a system and means whereby the propeller may within reasonable limits be kept at an optimum attitude with respect to the relative wind despite the fact that the aircraft itself may deviate from that attitude which is optimum for the propeller.

It is known that proposals have been made in the past for tilting a propeller or a power plant in a vertical plane and with respect to the longitudinal axis of an aircraft; these proposals have been made, so far as applicant is aware, for purposes different and distinct from those herein contemplated, such for instance as for changing the attitude of the power plant and lifting system of an airplane while maintaining the load carrying portion thereof in a horizontal or substantially horizontal attitude, regardless of the angle of attack of the relative wind on the aircraft or its components.

It is a further object of this invention to provide a system for inclining a propeller system in a vertical plane with respect to the aircraft, preferably with respect to longitudinal axis of an aircraft or the defined reference plane of the aircraft, such inclination being held within rather small limits and being automatically attainable in response to deviations in angle of attack of the aircraft, or angular deviations of the longitudinal axis of the aircraft from the direction of the ambient air stream, also referred to herein as the relative wind.

There are several alternative modes of controlling the angular position of the propeller with respect to the aircraft, and all may properly include a servo system by which the propeller, or the propeller and engine combination, may be tilted relative to the airplane by a power device. The power device is caused to operate by a signal from an automatic attitude sensing system which may comprise (a) a wind vane which normally assumes an attitude parallel to the relative wind, (b) a balanced Pitot tube arrangement, (c) direct stress measurement of stress increments on the propeller or power plant due to L. P. effect, or (d) a computed signal for actuating the servomotor such signal being dependent upon the air speed of the aircraft and the gross weight thereof. In the use of the latter type of sensing, there is a definite angle of attack condition for each combination of air speed and gross weight of the aircraft so that angle of attack may readily be calculated, either manually or automatically.

It is to be noted that the teachings of this invention are to be practiced primarily during sustained periods of operation where the aircraft longitudinal axis lies at an angle to the relative wind, or alternatively stated, where the propeller disk may be, if uncorrected, in a position other than normal to the relative wind. Vibration conditions excited by the L. P. factor which are of more or less transient character are not of great significance since the propeller and power plant structure are capable of sustaining them for short durations. Such transient conditions might be induced by gusts or by more or less violent maneuvering of the aircraft in the air. While correction of the L. P. vibration effects might be strived for, for these transient conditions, it is not deemed practicable at this time to produce a sensing and servo system whose responses will be rapid enough to take care of these conditions. As the art progresses, however, it might be desirable to take care of these transient conditions. It is deemed to be within the scope of this invention to provide means for compensating L. P. propeller vibration stress effects for either long periods or short and transient periods where these vibration effects may occur.

Mechanism for tilting a propeller for the purpose described necessarily involves a moderate penalty in complication and weight—penalties normally avoided by the competent designer unless he is forced to adopt them because of greater penalties threatening him. This invention is useful primarily in aircraft having a wide speed range and a wide range between maximum gross weight as at takeoff, and low gross weight as at the end of a long flight when fuel is expended and in the case of military aircraft, when the military load is expended. In such aircraft, the angle of attack for sustained flight periods may be as great as 4–6°. Changes in the design of propeller blades can be made to hold stresses therein at reasonable levels for all flight conditions but such changes involve either a severe weight increase in the blades, keeping the aerodynamic characteristics constant, or, a severe diminution in aircraft speed if blade weight is kept constant. Either of these design changes can be avoided by using the teachings of this invention, when its disadvantages become less than the disadvantages resulting from blade redesign.

Objects of the invention in addition to those stated and inferred above will be appreciated in reading the following detailed specification and claims and in viewing the drawings. The teachings herein, except as they may be limited by the appended claims, are not to be construed as limiting the scope of the invention.

In the drawings in which similar reference characters represent similar elements, Fig. 1 is a longitudinal fragmentary section through a portion of an aircraft power plant system incorporating the invention;

Fig. 2 is a view similar to Fig. 1 incorporating an alternative angle of attack sensing system and control mechanism;

Fig. 3 is a fragmentary frontal view of the power plant system of Fig. 2 showing the relationship of some of the parts; and Fig. 4 is a side elevation of an aircraft incorporating the invention and showing, diagrammatically, a range of propeller tilting movements.

Referring first to Fig. 4, an aircraft fuselage 10 is shown equipped with the usual primary lifting surface 12 and the empennage 14, along with a power plant housing 16 at the forward end of the fuselage. This view shows a typical single engine aircraft but the invention likewise comprehends multi-engine aircraft wherein a plurality of power plants may be disposed either in the fuselage or along the wings. Within the housing 16 a power plant of any suitable type, indicated at 18, is embraced, said power plant preferably being tiltable in a vertical plane on trunnions 20. The power plant carries a shaft 22 upon which is mounted a propeller 24, the shaft 22 and the propeller 24 being tiltable with the power plant 18 in a vertical plane relative to the aircraft, so as to make a positive or negative angle, as noted at A, with the longitudinal axis 26 of the aircraft.

Should the aircraft be flying at a positive angle of attack, the aircraft axis 26 will lie at this positive angle with respect to the relative wind. In accordance with the teachings of this invention, it becomes desirable to tilt the power plant so that the propeller shaft axis, indicated at 28, will lie parallel to the relative wind, so that the propeller shaft axis makes the angle —A with the airplane axis, the numerical value of angle A being equal to the angle of attack. As the load or air speed conditions vary, the angle of attack, and thus the angle A may vary and may at times become positive or negative. Under normal operating conditions where sustained operation occurs at angle of attack other than zero, the angle A may not ordinarily exceed about 3° and, to simplify power plant installation problems, it will in all probability be desirable to limit the angular swing of the propeller axis relative to the aircraft between limits of plus and minus 3° or 4°.

Now referring to Fig. 1, the power plant including the engine 18, the shaft 22 and the propeller 24 comprise a unit swingably mounted in trunnions forming a portion of the engine mounting structure. This structure is indicated in the several figures as a yoke 28 having sufficient strength to support the power plant under all operating conditions. The upper portion of the engine 18 may be provided with a gear sector 30 which is engaged by a worm borne in the yoke 28, the worm and gear engagement normally being irreversible and serving to hold the power plant firmly from tilting due to extraneous influences. A reversible motor 34 may be secured to the yoke 28 which may be operated to drive the worm 32 through a reduction gear 36, to tilt the power plant in the vertical plane clockwise or counter-clockwise as shown relative to the aircraft proper.

The motor 34 provides a servo device responsive to angle of attack signals produced by an angle of attack sensing system 38 now to be described. This system includes a wind vane 40, having a counterbalance 41 if desired, swingably supported on a suitable bracket 42 secured to the aircraft, the wind vane 40 preferably being located in the free air stream so that it will follow, at a zero angle of attack, any deviations or changes occurring in the direction of the relative wind with respect to the aircraft, thus indicating the angle of attack of the aircraft. The vane 40 will accordingly lie parallel to the relative wind at all times. The vane carries an arm 44 provided at its upper end with a contact 46, the vane also being provided if desired with a dash pot 48 connected thereto to overcome oscillating or fluttering tendencies of the vane 40. A member 50 is pivoted to the aircraft as at 52 for swinging, in the vertical plane as shown but it may move about or along other axes, and this member carries contacts 54 and 56 one or the other of which is engageable at times with the vane controlled contact 46. The member 50 is also connected to the power plant through a control rod 58 so that the position of the member 50 along its controlled path of movement will be established by the position of the power plant 18 in the aircraft.

As Fig. 1 is drawn, the propeller axis is parallel to the aircraft axis and the aircraft is assumed to be flying at zero angle of attack. Should the angle of attack of the aircraft be changed in a positive direction, either by maneuvering, air speed change, or loading, the vane 40 will swing counter-clockwise as shown by the dotted arrow to stay parallel to the relative wind, causing engagement of the contact 46 with the contact 54. This will close a grounded electrical circuit including the conductor 60, the limit switch 62 (to be described in detail later) and a relay or repeater 64 by which the motor 34 is energized to produce downward or counter-clockwise tilting of the power plant with respect to the airplane about the trunnions 20, the power plant and propeller movement, and the corresponding movement of other elements, being indicated by the dotted arrows. As the power plant rotates counter-clockwise on the trunnions, the control rod 58 will swing the member 50 in a clockwise direction and when the power plant reaches an angular position equal to the angular position of the vane 40, both relative to the aircraft, the contacts 54 and 46 will separate, terminating energization of the motor 34 and allowing the power plant to remain in such a position that the propeller axis will lie parallel to the direction of the relative wind. Alternatively stated, the propeller will be position controlled as to its plane of rotation so that said plane is normal to the direction of the relative air, and thus excitation of L. P vibrations due to propeller tilting is avoided.

Should a negative angle of attack be imposed upon the airplane, or correction of the positive angle of attack in a negative direction be called for, the vane 40 will move in a clockwise direction, engaging the contacts 46 and 56, completing a circuit involving the conductor 68 and limit switch 70, energizing the motor 34 to tilt the power plant up relative to the aircraft. Such upward movement will be terminated when the member 50, following the motion of the power plant, opens the circuit of the motor 34 by separation of the contacts 46 and 56.

The limit switches 62 and 70 mentioned above are normally closed and are carried on a bracket 72 rigid with the aircraft. An arm 74 which may be secured to the engine journal carried in the trunnion 20 has fingers 76 which when the power plant is tilted either up or down to a desired limiting angle relative to the aircraft axis, will open the switches 70 and 62 respectively, thereby terminating propeller tilting movement even though additional propeller movement may be called for by the sensing vane 40. These limit switches establish practical limits for tilting, and although angles of attack greater than the angles established by the limit switches may occur in flight operation, they would likely be transient occurrences which require no correction since, as above noted, the propeller and power plant system are capable of assuming the high stress conditions induced by L. P. vibration for short periods of time.

To complete circuit description, the motor 34 may be furnished with power from a battery such as 78, one terminal thereof being grounded and the other being connected to the motor. The motor is of the reversible type incorporating if desired forward and reverse field windings connected to the relay 64 through conductors 60' and 68'. The specific nature and location or disposition of the sensing system 38, the servomotor 34, the limit switches 62 and 70 and other components of the power plant tilting mechanism may be varied to a considerable extent. It is further contemplated that the propeller alone may be arranged for tilting independently of the aircraft power plant. Accordingly, the showing wherein the power plant and propeller comprise an integrated unit should not be construed as limiting the invention.

In the alternative embodiment of the invention shown in Fig. 2, the general arrangement of the power plant 18, the propeller 24, the trunnions 20 and the power plant tilting motor 34 and associated drive mechanisms are substantially the same as previously described. As in the case of Fig. 1, the power plant mounting and tilting arrangements are shown as they are for the purpose of explanation and are not to be construed as being either typical of or similar to any actual power plant installation in an aircraft. The Fig. 2 embodiment includes the limit switches 62 and 70 actuatable at times by the member 74 movably with the power plant.

The angle of attack sensing system comprises a pair of oblique Pitot tubes 84 and 86 mounted in a movable carrier 88 disposed on the airplane, as for instance on the wing as shown in Fig. 3, where the Pitot tubes are acted upon by an undisturbed air stream. The Pitot tube 84 is slanted upwardly and the Pitot tube 86 downwardly and the tubes are respectively connected to opposed bellows 90 and 92 within the aircraft by tubes 94 and 96, portions of said tubes being flexible to allow tilting of the carrier 88 in a vertical plane relative to the aircraft. The bellows 90 and 92 are connected at their free ends by a member 98 equipped with a grounded double contact 100. This contact may move up or down as shown under the influence of the bellows 90 and 92 to engage either an upper fixed contact 102 or a lower fixed contact 104. The contact 102 is connected by the wire 60, through the limit switch 62, to the relay 64 and thence through the wire 68' to the motor 34 to effect downward engine tilting. In similar fashion, the fixed contact 104 is connected through the wire 68 to the limit switch 70 and to the relay 64 for operation of the motor 34 through the wire 68' to effect upward engine tilting.

The Pitot tube carrier 88 is controlled as to its vertical tilt by a shaft or the like 106 having a lever 108 pivoted at 110 to a member 112 secured to the power plant 18. This mechanism directly couples the Pitot tube carrier 88 to the power plant. The linkage 106, 108, 112 is schematically shown and in an actual embodiment is arranged as a remote coupling between engine and Pitot carrier whereby the angular position of the Pitot carrier will always be the same as the angular position of engine or propeller in the respective vertical planes of movement.

In operation, the relative wind impinges upon the open ends of the Pitot tubes 84 and 86. If the tubes are symmetrical with respect to the direction of the relative wind, the pressure upon each tube will be the same and consequently, the pressure in the bellows 90 and 92 will be the same, centering the movable contact 100 between the fixed contacts 102 and 104 without engaging either fixed contact. Should the airplane assume, for instance, a positive angle of attack, the relative wind will impinge more fully upon a relatively large projected area at the end of the Pitot tube 86, creating a higher pressure therein, and will impinge upon a smaller projected area on the end of the Pitot tube 84, reducing the pressure therein. Consequently, the bellows 92 will expand and the bellows 90 will contract, moving the contact 100 into engagement with the fixed contact 102 to initiate operation of the tilting motor 34 to swing the power plant and propeller counter-clockwise about the trunnions 20.

Through the connection 106 between the power plant and the Pitot carrier 88, the latter will move with the power plant and as the Pitot tubes reach symmetry with the relative wind, representing zero angle of attack, pressure will be equalized in the bellows 90 and 92 to open the contact 100, stopping operation of the tilting motor 34 and adjusting power plant to zero angle of attack. Should the angle of attack of the aircraft then decrease or should the angle of attack become negative, the opposite effect from that above described will take place. In this situation, the pressure in the Pitot tube 84 will be higher than that in the tube 86, the bellows 90 and 92 will respectively expand and contract, and the tilting motor 34 will be energized to tilt the power plant in a clockwise direction as shown through the closure of the switch point 100 with the switch point 104. The position followup afforded by the elements 106 through 112 will at all times terminate tilting of the power plant system at the instant angle of attack position at which the aircraft is flying, up to the maximum positive or negative angle of attack angle established by the limit switches 62 and 70 whose operation was described previously.

As stated in connection with Fig. 1 for the control components thereof, the control components in Fig. 2 may be varied in form, operation and location as desired by those skilled in the art and the particular schematic arrangement of these components is not to be construed as limiting the scope of the invention.

It was mentioned heretofore that sensing signals to control tilting of the propeller and/or power plant could be attained by the use of electrical strain gages disposed either on the propeller or on the power plant. Since the circuits and operation of strain gages are well known in the art, a system of this sort has not been shown as an alternative to the sensing systems disclosed in Figs. 1 and 2. In general, strain gages can be disposed on the propeller and connections made thereto through conventional slip ring and brush arrangements, the strain gages being connected to a bridge and amplifier system so that measured strains over a certain value and as occasioned by L. P. vibrational stress in the propeller can produce a signal to cause tilting of the power plant in the appropriate direction. Alternatively, strain gages may be disposed in an engine mounting system or upon the engine, such gages being connected through bridge and amplifier circuits to afford tilt correction of the power plant. In the use of strain gages on the engine the circuits would be adjusted to sense any stresses in excess of those normally encountered in operation and due to L. P. propeller effect transmitted through the propeller shaft and engine to the gages or through the propeller shaft, engine, and engine mount to the gages.

An alternative sensing system was mentioned previously where angle of attack may be computed from the factors of indicated air speed and gross weight of the airplane. To accomplish control in this fashion, such control not being shown in the drawing, a more or less conventional air speed meter may be interconnected with either an automatic or manually adjustable gross weight indicator, the indicator signals being combined and computed to yield a signal of angle of attack which is arranged to operate the power plant tilting mechanism, which might include for example a servomotor such as the motor 34 shown in Figs. 1 and 2.

Various other alternative angle of attack determining means may occur to those versed in the art and any appropriate angle of attack signal system may be utilized to accomplish the stated and inferred objectives of the invention.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. In aircraft comprising a wing and control surfaces and having a driving propeller, the propeller having a shaft whose axis is substantially alined with the direction of flight, said aircraft being adapted to fly under steady-state conditions, at varying angles of attack to the relative wind depending upon aircraft speed and loading, and being controllable at all times by said control surfaces; said propeller when its shaft axis is not alined with the relative wind being subject to vibration forcing impulses due to differences in air flow over the blades of the propeller which lie above and below the axis, means to mount said propeller, with its shaft, for limited vertical tilting in a plane substantially parallel to the aircraft plane of symmetry and about a transverse tilting axis, a motor drivably engaged with the propeller energizable to tilt said propeller about said tilt axis, a device embodying a reference axis, said device being directly coupled to the propeller for parallel movement of said reference axis with the propeller shaft axis during vertical tilt of said propeller, means in said device to sense deviations of the direction of the relative wind with respect to said reference axis, a circuit for energizing said motor, normally open switch means in said circuit, and means arranged to close said switch means responsive to deviations in the relative wind direction with respect to the reference axis, said switch means when closed energizing the motor to tilt said propeller and said device to aline said reference axis with the direction of the relative wind.

2. Apparatus according to claim 1 including a normally closed limit switch in said motor circuit, and means to open said limit switch actuated by tilt of said propeller to an extreme angle, to de-energize said motor.

ROBERT O. FROLING.

REFERENCES CITED

The following references are of record in the file of this patent:

UNITED STATES PATENTS

| Number | Name | Date |
|---|---|---|
| 1,601,062 | Dyer | Sept. 28, 1926 |
| 1,763,590 | Klamperer | June 10, 1930 |
| 1,832,433 | Tarbox | Nov. 17, 1931 |
| 1,889,273 | Avery | Nov. 29, 1932 |
| 1,889,766 | Altieri | Dec. 6, 1932 |
| 2,023,334 | Marmonier | Dec. 3, 1935 |
| 2,176,476 | Twining | Oct. 17, 1939 |
| 2,343,288 | Fink | Mar. 7, 1944 |

FOREIGN PATENTS

| Number | Country | Date |
|---|---|---|
| 24,728 | France | June 20, 1922 |
| | (2nd addition to No. 539,323) | |
| 383,494 | Great Britain | Nov. 17, 1932 |